United States Patent [19]
Fowler

[11] 3,800,945
[45] Apr. 2, 1974

[54] CELL HAVING CATALYTIC ACTION FOR COALESCING OIL DROPLETS

[75] Inventor: Leslie L. Fowler, Tulsa, Okla.

[73] Assignee: Cata-Sep, Inc., Tulsa, Okla.

[22] Filed: Nov. 26, 1971

[21] Appl. No.: 202,487

[52] U.S. Cl.............. 210/73, 210/83, 210/489, 210/505
[51] Int. Cl............................................ B01d 27/02
[58] Field of Search.. 210/DIG. 5, DIG. 1, 489–491, 210/504, 505, 73, 83, 84

[56] References Cited
UNITED STATES PATENTS

| | | | |
|---|---|---|---|
| 2,395,301 | 2/1946 | Sloan | 210/DIG. 5 |
| 3,266,973 | 8/1966 | Crowley | 210/DIG. 1 |
| 3,034,981 | 5/1962 | Poelman | 210/504 |
| 3,142,612 | 7/1964 | Reiman | 210/DIG. 5 |
| 2,517,753 | 8/1950 | Ximenez et al. | 210/490 |

FOREIGN PATENTS OR APPLICATIONS 864,311 2/1971 Canada.......................... 210/DIG. 5

Primary Examiner—John Adee
Attorney, Agent, or Firm—Head & Johnson

[57] ABSTRACT

A cell having catalytic action for coalescing oil droplets dispersed in a water emulsion including a perforated core into which the emulsion is injected, a layer of emulsion breaking fibrous material wound about the core through which the emulsion passes, and catalytic material in the form of small solid particles impregnated in the fibrous material. The invention also includes the method of coalescing oil droplets dispersed in a water emulsion including the steps of passing an emulsion through a fibrous material impregnated with small solid particles of catalytic material.

4 Claims, 2 Drawing Figures

PATENTED APR 2 1974   3,800,945

INVENTOR.
LESLIE L. FOWLER
BY
Head & Johnson
ATTORNEYS

CELL HAVING CATALYTIC ACTION FOR COALESCING OIL DROPLETS

BACKGROUND AND SUMMARY OF THE INVENTION

A problem frequently encountered in industry is that of separating oil from a water emulsion. While the problem may arise in many ways, an example is that which occurs when oil is spilled on the surface of water, such as when an underwater pipeline breaks, a tanker carrying crude develops a leak or breaks up in a storm, or the like. In addition to these accidental instances wherein water is mixed with oil, in many industries the problem occurs as a normal part of manufacturing and treating processes utilizing methods and facilities wherein the mixing of oil and water cannot be averted.

In all these instances it is necessary to provide some means of extracting or separating the entrained oil from the water. In a broader sense the problem is that of separating an entrained immiscible liquid from a water base medium, oil and other petroleum products being good examples of such immiscible liquids.

One of the best known methods of separating oil from water is the use of a coalescing cell. As an example, reference may be had to U.S. Pat. No. 3,450,632 which describes a method of separating oil dispersed in a liquid medium by coalescing the oil droplets. The emulsion is passed through fibrous material which causes the dispersed oil droplets to coalesce and float to the surface of the water.

This invention relates to a method of improving the effectiveness of coalescing oil droplets suspended or entrained in a water phase. More particularly, the invention is directed towards improving the effectiveness of the coalescing action of fibrous materials through which oil and water emulsions are passed.

OBJECTS OF THE INVENTION

It is an object of this invention to provide an improved cell for coalescing oil droplets dispersed in a water emulsion.

More particularly, an object of this invention is to provide a method of improving the coalescing of oil droplets dispersed in a water emulsion.

Still more particularly, the invention relates to a cell having catalytic particles dispersed in a fibrous material for more effective coalescing of oil droplets dispersed in an emulsion.

These general objects, as well as other objects, will be fulfilled in the apparatus and method to be described, taken in conjunction with the attached drawing.

DESCRIPTION OF VIEWS

DETAILED DESCRIPTION

Figures 1, 2:
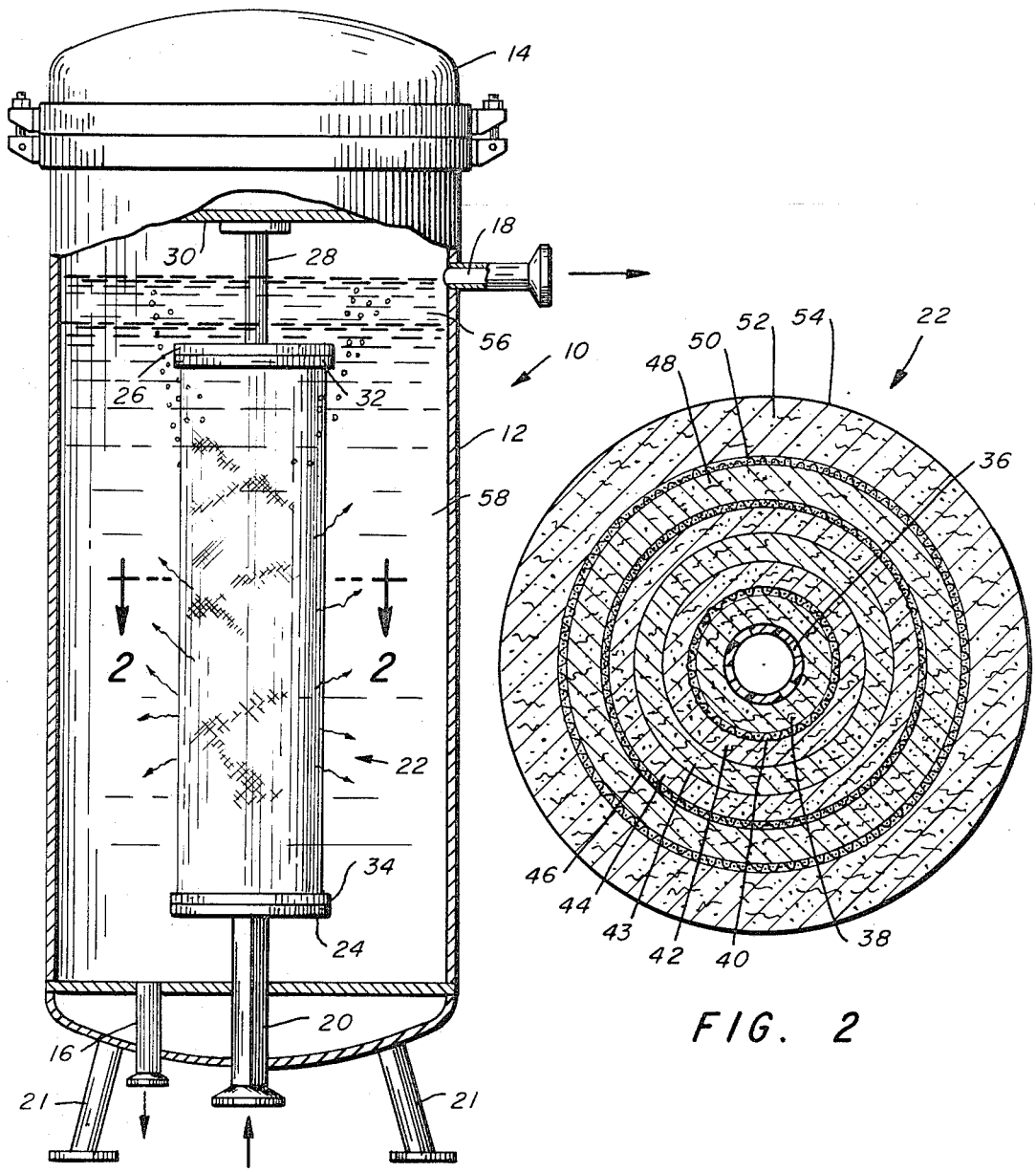
FIG. 1 is an elevational view of an embodiment of a separator for separating oil suspended in a water emulsion, the separator being shown partially cut away to show an elevational view of an improved cell for coalescing oil droplets dispersed in a water emulsion.
FIG. 2 is a cross-sectional view taken along the line 2—2 of the cell of FIG. 1 showing the construction of the cell.

Referring to the drawings, and first to FIG. 1, an oil-water separator is generally indicated by a numeral 10. The separator includes a vessel 12 having a removable top 14, a water outlet 16 in the bottom thereof, and oil outlet 18 in the side wall adjacent top 14. Vessel 12 is supported on legs 21. Emulsion is introduced into the vessel through inlet 20. Positioned within the vessel is a cell, generally indicated by the numeral 22, which performs the function of coalescing oil droplets entrained in the emulsion introduced through inlet 20 to effect the separation of the two liquids.

The upper end of inlet 20 is provided with a plate 24. An opposed upper plate 26 is affixed to the lower end of a downwardly extending rod 28 affixed to the interior of the vessel, such as to a bar 30 extending across the top portion. Thus the cell 22 is positioned between plates 24 and 26 in a manner to receive the flow of emulsion from inlet 20.

The specific arrangement for supporting cell 20 in vessel 10 is illustrated as an example only and is not a part of the invention. Many means are known for supporting filter cartridges and the like in vessels in a removable and leakproof arrangement all of which may be utilized in practicing the invention.

The essence of the invention is the construction and the method of operation of cell 22. As shown in FIG. 1, the cell 22 includes an upper end cap 32 which sealably engages plate 26 and a lower end cap 34 which engages lower plate 24.

Referring to FIG. 2, a cross-sectional view of cell 22, the construction of the cell is best illustrated. The cell includes an elongated perforated core tube 36. By means of an opening in lower end cap 34 the interior of core tube 36 communicates with the interior of inlet 20 so that emulsion injected into inlet 20 flows into the interior of core tube 36 and out through the perforations therein. Wound about core tube 36 is a plurality of layers of material having the characteristic of achieving the coalescence of dispersed oil droplets. The layers may vary as to composition, porosity, density, thickness, and so forth. As an example, the first layer 38 surrounding core tube 36 may be of emulsion breaking fibrous material, such as polyester fibers, acrylic fibers, modacrylic fibers, or fiberglass. The next layer 40 may be a structural layer, such as a fiberglass screen to protect the outer layers of material from inlet fluid pressures.

The next three layers, 42, 43, and 44, may be of fibrous material such as the material above mentioned. The layers may be of varying densities. Next may be provided a fiberglass layer 46 folled by a fiber layer 48 and a third fiberglass layer 50. The final emulsion breaking layer 52 is covered with an outer shrowd 54 which may be of course polyester fibrous material.

The cell described to this point is not unlike other cells of known use for coalescing dispersed oil droplets in a water emulsion to separate oil from water. The improvement of this invention is the provision of means for augmenting the efficiency and effectiveness of coalescing of oil droplets as they migrate outwardly from the core tube 36 to the exterior of the cell 22. The essence of this invention is the provision of improved means of causing the coalescence of oil droplets. It has been learned that catalytic material placed in the emulsion breaking fibrous material, such as in one, some, or all of the layers of fibrous materials 38, 42, 43, 44, 48, and/or 52 improves the effectiveness of the formation of large drops or globules of oil as the emulsion passes from the interior to the exterior of the cell. Such catalytic material may be such as diatomaceous earth, asbestos particles, silica, or mixtures of these materials.

The catalytic material is impregnated into the fibrous coalescing material. The size of the catalytic particles may vary in size from 10 microns to 150 microns. The preferred range is from 30 to 100 microns.

The amount of catalytic material utilized may vary although an amount of approximately 1 to 6 pounds of a catalytic material for a cell of 6 inches in outside diameter and 36 inches long produces effective results.

The catalytic material may be applied to the fibrous coalescing material in several ways. One arrangement is to salt or sprinkle the catalytic material on to the fibrous material as it is wound about core 36.

The method of this invention may be practiced utilizing vessels having many configurations that substantially depart from that of vessel 10 and in which the cells are arranged in many different ways. In addition, the configuration of the cell required to practice the invention may depart drastically from the illustrated embodiment.

The method of the invention to achieve improved coalescing of oil droplets dispersed in a water emulsion includes passing the emulsion through a medium of fibrous material impregnated with solid catalytic particles, the particle size being between 10 and 150 microns. and the particles being diatomaceous earth, asbestos particles, silica or mixtures of these.

As shown in FIG. 1 the emulsion entering inlet 20 passes outwardly through the cell 22. As the dispersed oil droplets migrate through the cell they are caused to coalesce into larger droplets by the action of the emulsion breaking fibrous material, augmented by the catalytic particles. While the exact reason the catalytic particles improve the effectiveness of the coalescing action of the fibrous material is not precisely known, it is believed that the particles form nuclei around which finely dispersed oil droplets may form to grow in size as the droplets migrate through the cell. As the oil droplets move to the exterior of the cell they grow in size sufficient to form globules which overcome the surface tension of the cell and the water to arise to the surface to form a layer of oil 56. The oil thus accumulates on top of water 58 contained in the lower portion of the vessel.

The collected oil 56 passes out of the vessel through outlet 18 while water is drawn off through outlet 16. Means must be provided for maintaining the level of water in vessel 12. Many different means are known and utilized in industry for this purpose, including the use of interface floats. (not shown)

While the invention has been described with a certain degree of particularity, it is manifest that many changes may be made in the details of construction, the steps of practice, and the arrangement of components without departing from the spirit and the scope of this disclosure. It is understood that the invention is not limited to the embodiment set forth herein for purposes for exemplification, but is to be limited only by the scope of the attached claim, or claims, including the full range of the equivalency to which each element or step thereof is entitled.

I claim:

1. A cell for coalescing oil droplets dispersed in a water emulsion, comprising:
   an elongated perforated tube core into which the emulsion is injected;
   a layer of emulsion breaking fibrous material wound about said core through which the emulsion is forced to pass, the fibrous material being selected from the class consisting of glass fibers, polyester fibers, acrylic fibers, modacrylic fibers, and mixtures of such fibers; and
   a catalyst of small, solid, bare particles loosely dispersed in said fibrous material, the size of the particles being between 10 and 150 microns, and the particles being selected from the class consisting of diatomaceous earth, asbestos particles and silica particles.

2. A cell for coalescing oil droplets dispersed in a water emulsion according to claim 1 wherein said layer of emulsion breaking fibrous material includes a plurality of layers of such material having varying densities, said catalysts being dispersed in at least one of said layers.

3. A method of coalescing oil droplets dispersed in a water emulsion comprising passing the emulsion through a medium of fibrous materials impregnated with solid, bare particles loosely dispersed in the fibrous material, the fibrous materials being selected from the class consisting of glass fibers, polyester fibers, acrylic fibers, modacrylic fibers, and mixtures of such fibers, and a catalyst of small solid, bare particles being selected from the class consisting of diatomaceous earth, asbestos particles, and silica particles, the size of the particles being between 10 and 150 microns.

4. A cell for coalescing oil droplets dispersed in a water emulsion, comprising:
   an elongated perforated tube core into which the emulsion is injected;
   a layer of emulsion breaking polyester fibrous materials wound about said core through which the emulsion is forced to pass; and
   a catalyst of small, solid, bare particles of diatomaceous earth loosely impregnated into the fibrous materials, the size of the particles being between 10 and 150 microns.

* * * * *